United States Patent [19]

Becker et al.

[11] Patent Number: 4,832,148

[45] Date of Patent: May 23, 1989

[54] METHOD AND SYSTEM FOR MEASURING AZIMUTHAL ANISOTROPY EFFECTS USING ACOUSTIC MULTIPOLE TRANSDUCERS

[75] Inventors: David F. Becker, Houston; Sen-Tsuen Chen, Sugar Land; Azik I. Perelberg; Graham A. Winbow, both of Houston, all of Tex.

[73] Assignee: Exxon Production Research Company, Houston, Tex.

[21] Appl. No.: 94,482

[22] Filed: Sep. 8, 1987

[51] Int. Cl.[4] ............................................. G01V 1/40
[52] U.S. Cl. ................................... 181/104; 181/108; 367/25
[58] Field of Search .................... 367/25, 31; 181/102, 181/104, 108, 111, 112

[56] References Cited

U.S. PATENT DOCUMENTS

| | | | |
|---|---|---|---|
| 3,593,255 | 7/1971 | White | 367/25 |
| 3,821,740 | 6/1974 | Ehrlich | 342/374 |
| 4,450,540 | 5/1984 | Mallett | 367/31 |
| 4,479,206 | 10/1984 | Granberg et al. | 367/104 |
| 4,606,014 | 8/1986 | Winbow et al. | 367/75 |
| 4,649,525 | 3/1987 | Angona et al. | 367/31 |
| 4,649,526 | 3/1987 | Winbow et al. | 367/35 |
| 4,682,308 | 7/1987 | Chung | 367/31 |
| 4,685,091 | 8/1987 | Chung et al. | 367/31 |
| 4,713,968 | 12/1987 | Yale | 367/31 |

FOREIGN PATENT DOCUMENTS

| | | |
|---|---|---|
| 031989 | 7/1981 | European Pat. Off. . |
| 85.400306.8 | 9/1985 | European Pat. Off. . |

OTHER PUBLICATIONS

"Practical Use of Shear-Wave Splitting in VSP Surveys" by Charles Naville, Nov. 1986.
Outline, slides, and abstract of the paper "Seismic Detection of Subsurface Fractures" by D. F. Becker and A. I. Perelberg, presented at the 56th Annual International SEG Meeting, Houston, Tex. (Nov. 2-6, 1986).
"Detection of Anisotropy Using Shear-Wave Splitting in VSP Surveys: Requirements and Applications" by Charles Naville, (with introduction by S. Crampin), presented at the 56th Annual International SEG Meeting, Houston, Tex. (Nov. 2-6, 1986), and an Abstract of the paper.
"VSP Detection of Fracture-Induced Velocity Anisotropy" by D. H. Johnston, Abstract, presented at the 56th Annual International SEG Meeting Houston, Tex. (Nov. 2-6, 1986).
"Multipole Logging in Invaded Formations" by Baker, L. J. et al., Abstract, presented at the 55th Annual International SEG Meeting, Washington, D.C., (Oct. 6-10, 1985).
"Shear-Wave Logging with Dipole Sources" by S. T. Chen, abstract, presented at the 55th Annual International SEG Meeting, Washington, D.C., (Oct. 6-10, 1985).
U.S. patent application Ser. No. 379,684, filed May 9, 1982, and assigned to the assignee of the present application.
U.S. patent application Ser. No. 440,140, filed Nov. 8, 1982, and assigned to the assignee of the present application.
U.S. patent application Ser. No. 454,925, filed Jan. 3, 1983, and assigned to the assignee of the present application.

Primary Examiner—Thomas H. Tarcza
Assistant Examiner—Ian J. Lobo
Attorney, Agent, or Firm—Alfred A. Equitz; Jeffrey M. Hoster; Herbert E. O'Niell

[57] ABSTRACT

An acoustic borehole well logging method and apparatus for measuring azimuthal anisotropy of a formation traversed by a borehole using at least one multipole transducer. In a preferred embodiment, a dipole wave transmitter and at least one detector sensitive to dipole waves are employed. In an alternative preferred embodiment, a monopole transmitter and at least one multipole detector are employed. In the inventive method, two acoustic wave arrivals are detected, each associated with a different azimuthal orientation relative to the longitudinal axis of the borehole (i.e. each is transmitted by a multipole transmitter oriented at such angle, or is detected by a multipole detector oriented at such angle, or both). The inventive apparatus preferably includes at least one transducer unit including two or more multipole transmitters (or two or more multipole detectors) oriented at different azimuthal angles relative to the tool's longitudinal axis.

44 Claims, 3 Drawing Sheets

METHOD AND SYSTEM FOR MEASURING AZIMUTHAL ANISOTROPY EFFECTS USING ACOUSTIC MULTIPOLE TRANSDUCERS

FIELD OF THE INVENTION

The invention is a method and system for acoustic well logging. More particularly, the invention is a well logging method and system using at least one multipole transducer for measuring the velocity of acoustic waves in a subterranean formation traversed by a well.

BACKGROUND OF THE INVENTION

In conventional acoustic well logging operations, the velocity of an acoustic wave propagating through an earth formation traversed by a well may be determined. Throughout this specification, the synonymous terms "well" and "borehole" will be used interchangeably, and the phrases "acoustic wave" and "acoustic signal" will be used in their general sense to denote any compressional wave, shear wave, guided acoustic wave, or any other elastic wave. A conventional acoustic well logging system includes: a logging sonde that may be suspended downhole in the borehole fluid, a source contained within the sonde for generating compressional waves in the borehole fluid, and one or more detectors within the sonde and spaced apart from the compressional wave source for detecting compressional waves in the borehole fluid. Compressional-wave energy in the borehole fluid generated by the source is refracted into the earth formation surrounding the borehole.

Some of the energy in the compressional waves in the fluid is refracted into the formation surrounding the borehole. Some of the refracted energy then propagates in the formation as a refracted compressional wave, and some propagates in the formation as a refracted shear wave. Another portion of the energy radiated by the compressional-wave source is converted into the form of guided waves that travel in the borehole fluid and the part of the formation adjacent to the borehole. A portion of the energy in each refracted compressional wave and shear wave is refracted back into the borehole fluid in the form of compressional waves and reaches the detector in the logging sonde. The guided waves are also detected by such detector. Any wave that is one of these three types of waves detected by the detector may be called an arrival. The compressional-waves in the borehole fluid caused by refraction of compressional waves in the formation are called the compressional wave arrivals; those caused by refraction of shear waves in the formation are called the shear-wave arrivals; and those caused by guided waves are called the guided-wave arrivals. Thus, if the signal generated by the source is an impulsive signal, the signal detected by the detector is a composite signal which includes a number of impulsive components including the compressional-wave arrival, the shear-wave arrival and the guided-wave arrivals. In earth formations compressional waves travel faster than shear waves, and shear waves in the formation usually travel faster than the guided waves. Therefore, in the composite signal detected by the detector, the compressional-wave arrival is the first arrival, the shear-wave arrival is the second arrival, and the guided-wave arrivals are the last arrivals. In measuring the compressional-wave velocity of the formation, the time interval between generation of compressional waves and detection of the first arrival by the detector gives the approximate travel time of the refracted compressional wave in the formation. Hence the later shear-wave and guided-wave arrivals do not affect measurement of the compressional-wave velocity of the formation. The ratio of the distance between the source and detector to the time between generation and detection of the energy in the compressional-wave arrival yields the velocity of compressional waves in the formation. The distance between source and detector is usually fixed and known so that measurement of the time between compressional-wave generation and detection of the compressional-wave arrival is sufficient to determine the velocity of compressional waves in the formation. For better accuracy, such distance is usually much greater than the dimensions of the source or detector. Alternatively, measurement of the time interval between the detections of a compressional-wave arrival, at two detectors separated by a known distance, can be used to measure the velocity of compressional-waves in the formation.

Information important for production of oil and gas from subterranean earth formations may be derived from the compressional-wave velocities of such formations. It is also known that determination of the velocity of shear waves may yield information important for production of oil and gas from the formations. The ratio between the shear-wave velocity and compressional-wave velocity may reveal the lithology of the subterranean earth formations. The shear-wave velocity log may also enable seismic shear-wave time sections to be converted into depth sections. The shear-wave log is also useful in determining other important characteristics of earth formations such as porosity, fluid saturation and the presence of fractures.

Conventional compressional-wave logging sources of the monopole type generate compressional waves that are symmetrical about the axis of the logging sonde. When such monopole compressional waves are refracted into the surrounding earth formation and detected with conventional receivers of the monopole type, the relative amplitudes of the refracted monopole shear and compressional waves are such that it is difficult to distinguish the later shear-wave arrival from the earlier compressional-wave arrival and its reverberations in the borehole.

However, it has been proposed that a multipole transmitter-detector pair (i.e., a dipole-source/dipole-receiver pair, a quadrupole-source/quadrupole-receiver pair, or a higher-order-multipole-source/receiver pair where the multipole order of the source matches that of the receiver) be used in a well logging system to facilitate direct shear-wave velocity logging. Such a multipole well logging system, operated at the proper frequency, will produce arrivals at the detector such that the amplitude of the detected shear-wave arrival is significantly higher than that of the compressional-wave arrival. By adjusting the triggering level of the detector (and the system for recording the detected signal) to discriminate against the compressional-wave arrival, the shear-wave arrival is detected as the first arrival. Dipole acoustic wave well logging systems of this type are disclosed in U.S Pat. No. 4,606,014 issued Aug. 12, 1986 to Winbow, et al.; European Patent Application No. 031,989 by Angona, et al. (published July 15, 1981); and U.S. Pat. No. 3,593,255 issued July 13, 1971 to White. However, the prior art (including the cited references) teaches that the source and receiver (or receivers) of a dipole (or higher order multipole) system should be aligned so that each source and receiver is associated with substantially the same azimuthal angle relative to the borehole's longitudinal axis (i.e., the azimuthal angle between the source and receiver is 0°) so as to maximize the sensitivity of the system. Similarly, the references teach that if the azimuthal angle between a dipole source and a dipole receiver is 90°, the receiver will be insensitive to dipole wave energy produced by the source, and that if the angle between a quadrupole source and a quadrupole receiver is 45°, the receiver will not detect quadrupole radiation produced by the source.

Multipole transducers of the quadrupole, octopole, and higher-order multipole types are described in the following Applications and Patent, all assigned to the same assignee as is the present Application: U.S. patent application Ser. No. 379,684, filed May 19, 1982; U.S. patent application Ser. No. 440,140, filed Nov. 8, 1982; and U.S. Pat. No. 4,649,526, issued Mar. 10, 1987 to Winbow, et al.

It has for some time been known that thinly bedded horizontal formations and horizontally fractured rocks exhibit transverse isotropy. In this situation, the velocity of compressional and shear waves generally depends on their direction of propagation with respect to the vertical. However, their velocity is independent of the azimuthal direction in which they propagate. Alternatively, the formation may exhibit azimuthal anisotropy, in which compressional waves may travel at different speeds in different azimuthal directions away from (or toward) a vertical borehole. Similarly, the speeds of shear waves depend on the azimuthal direction (relative to the borehole axis) in which they propagate. Azimuthal anisotropy may be caused by vertical fractures, among other geologic factors.

In an azimuthally anisotropic medium, the velocity of a shear wave also depends on the polarization direction (i.e., the plane containing the particle motion). For example, the velocity of a vertically propagating shear wave whose polarization is North-South will in general differ from the velocity of a vertically propagating shear wave whose polarization is East-West.

In their simplest form, azimuthally anisotropic media have five independent elastic constants associated with them as compared with two independent elastic constants for fully isotropic media. In principle, more complex types of anisotropy are also possible, and describing those forms of anisotropy may require as many as 21 independent elastic constants.

Azimuthal anisotropy has been reported to be a widespread phenomenon. Even a small amount of azimuthal anisotropy (for example, 3%), where the amount of azimuthal anisotropy is defined to be $\epsilon = |(V_\perp - V_\parallel)/V_\parallel| \cdot 100\%$ where $V_\parallel$ = velocity of wave propagating with polarization parallel to a selected direction, and $V_\perp$ = velocity of wave having the same frequency content but having polarization perpendicular to the selected direction (for example, parallel and perpendicular to fracture orientation $V_\parallel$ and $V_\perp$ will be slow and fast velocities) has a significant effect on correlating shear-wave seismic data.

If azimuthal anisotropy could be detected and quantified during a well logging operation, the information could be used to help interpret direct hydrocarbon indicators, locate and define fractured reservoirs, and deduce lithologic information from seismic data. Azimuthal anisotropy data, gathered during such a well logging operation, might also be used in performing production studies of fractured reservoirs since the information regarding azimuthal anisotropy is indicative of the existence and orientation of vertical fractures provide high-permeability pathways for hydrocarbons and reservoir quality.

Until the present invention, it has not been recognized how the effects of azimuthal anisotropy may be measured using well-logging tools.

SUMMARY OF THE INVENTION

The inventive method uses at least one multiple transducer to measure the azimuthal anisotropy of a formation traversed by a borehole. The phrase "multipole transducer" is used throughout this Specification, including the claims, to denote transducers having multipole order, n, greater than zero (i.e. the phrase "multipole transducer" denotes a dipole transducer, a quadrupole transducer, an octopole transducer, or a higher-order multipole transducer, but does not denote a monopole transducer). For a monopole transducer, n=0, for a dipole transducer, n=1, for a quadrupole transducer, n=2, and so on. In general, for a $2^n$-pole transducer, the multipole order of the transducer is equal to n. The multipole order, n, is always a non-negative integer. The term "transducer" will be used throughout this specification, including the claims, to denote either a transmitter or a receiver. The synonymous terms "detector" and "receiver" will be used interchangeably. The waves produced by a multipole transducer will be referred to as "multipole waves."

In the inventive method, an acoustic signal is generated at a transducer disposed in the borehole, the signal propagates into the formation, and an arrival of the signal is detected at another transducer disposed in the borehole. At least one of the transducers is a multipole transducer oriented at a first azimuthal angle relative to the borehole's longitudinal axis. Another acoustic signal arrival, associated with a second azimuthal angle relative to the borehole longitudinal axis, is also detected at a transducer disposed in the borehole. This latter arrival either includes wave energy generated at a multipole transmitter oriented at the second azimuthal angle, or it is detected at a multipole detector oriented at such angle, or is generated by such transmitter and detected by such detector. If the formation is azimuthally anisotropic, different acoustic wave velocities will be associated with the two arrivals. The anisotropy may be studied by analyzing the detected arrivals.

In a preferred embodiment of the inventive method, a single dipole transmitter is operated to generate the acoustic signal (or signals) employed, and the arrivals are detected at two dipole receivers oriented at different azimuthal angles. In an alternative preferred embodiment, a single monopole transmitter is operated to generate the acoustic signal (or signals), and the arrivals are detected at two quadrupole receivers oriented at different azimuthal angles. More generally, when studying formations exhibiting azimuthal anisotropy, it is preferred that for each transmitter-receiver pair used in performing the inventive method (or included in the inventive system), if the multipole order of one transducer in the pair is n, the multipole order of the corresponding transducer should be n+2m, where n+2m≧0, and m is an integer (positive, negative, or zero).

There are numerous variations on the preferred embodiments. For example, a single acoustic signal may be generated, and arrivals of this wave then detected at two detectors. Alternatively, a first signal may be generated and detected and thereafter, a second signal generated and detected. The two signals may be generated by the same transmitter, and detected by the same detector, if either the source or detector is rotated azimuthally relative to the other between the two signal detection events. Alternatively, two distinct source-detector pairs may be employed in performing the method.

The inventive borehole logging system will preferably include at least one dipole transmitter and at least one dipole detector, or one monopole transmitter and at least one quadrupole detector, or at least one quadrupole transmitter and one monopole detector. Preferably, two multipole transmitters (or two multipole detectors) are included, where the two transmitters (or detectors) are positioned at distinct azimuthal orientations. Alternatively, only one multipole transducer is included, and a means for rotating the multipole transducer between acoustic signal generation (or detection) events is also included.

DETAILED DESCRIPTION OF THE PREFERRED EMBODIMENTS

Figures 1, 2:
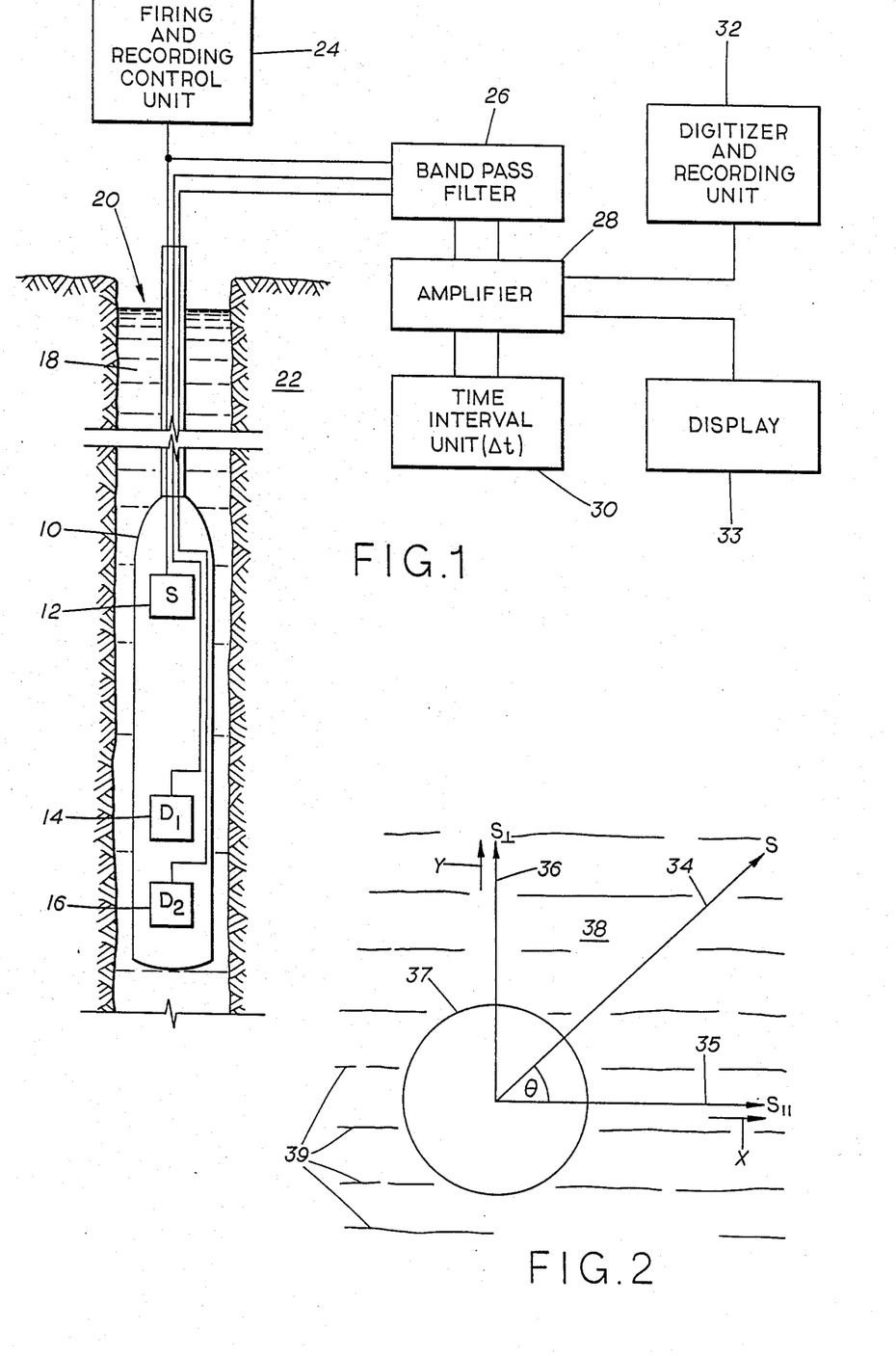
FIG. 1 is a schematic view of a well logging system that may embody the invention.
FIG. 2 is a cross-sectional view of a formation traversed by a borehole and having fractures oriented along the x-axis.

FIG. 1 is a schematic view of an acoustic well logging system that may embody the invention. Logging sonde 10 is adapted to be raised and lowered into well 20 surrounded by earth formation 22. Sonde 10 houses transducer 12 for generating an acoustic wave and two transducers (14 and 16) for detecting arrivals of the acoustic wave(s). To initiate logging, sonde 10 is suspended in fluid 18 contained in borehole 20. Detectors 14 and 16 are mounted in sonde 10 in positions spaced along the longitudinal axis of borehole 20 from each other and from source 12. Source 12 is connected to firing and recording control unit 24. Although the firing and recording control unit is shown in FIG. 1 as a separate unit from the logging sonde, the part of unit 24 that powers the acoustic wave source may, for convenience in operation, be housed by the logging sonde. Signals recorded by detectors 14 and 16 are fed to band-pass filter 26, amplifier 28 and time-interval unit 30. After amplification by amplifier 28 the signal may be digitized and recorded in unit 32, or may be displayed in unit 33, or may be both recorded and displayed in units 32 and 33.

Firing and recording control unit 24 is operated to fire source 12 which produces an acoustic wave (which may include both shear and compressional wave components) in formation 22. Acoustic wave arrivals are detected by detectors 14 and 16. Sonde 10 will typically contain a pre-amplifier (not shown in FIG. 1) which amplifies the acoustic wave arrivals detected by detectors 14 and 16. The amplified signals are then filtered by filter 26 and amplified again by amplifier 28. The time interval between the arrival at detector 14 and the corresponding arrival at detector 16 is then measured by time-interval unit 30. The measured time interval may be stored or displayed as desired.

Alternatively, the detected signals may be displayed (such as by display unit 33) before, instead of, or in addition to being processed in time-interval unit 30. In another alternative embodiment, a signal representing the time at which source 12 transmits an acoustic wave may be supplied to filter 26, amplifier 28, and time-interval unit 30. In this alternative embodiment, unit 30 will measure the time interval between transmission of an acoustic signal from source 12 and the arrival of acoustic energy in the signal at a single detector (i.e., either detector 14 or 16).

In accordance with the invention, either detectors 14 and 16 or source 12, or all three of these transducers must be of the multipole type. The invention relies on the property that a multipole transducer may be oriented in a particular azimuthal direction relative to the longitudinal axis of a borehole. FIG. 2 is a cross-sectional view of borehole 37 having longitudinal axis perpendicular to the plane of FIG. 2. A multipole acoustic source (not shown) in borehole 37 will have 2n vibrating elements (where n is the multipole order of the source, an integer greater than zero) arranged around the tool's longitudinal axis. The transducers of the inventive logging system (when operated in a borehole traversed by an azimuthally anisotropic formation such as formation 38 of FIG. 2) may be oriented to produce multipole acoustic waves that have polarization (identified by arrow 34 in FIG. 2) in the azimuthal direction $\theta$. Formation 38 traversed by borehole 37 is azimuthally anisotropic since it is permeated with vertical fractures 39 that are oriented parallel to the x-axis. Wave S (the acoustic wave initially propagating with polarization in the direction of arrow 34) will have component waves $S_\parallel$ and $S_\perp$ (with relative amplitudes determined by $\theta$, the azimuthal orientation of the initial stress creating the wave) whose polarizations, 35 and 36 respectively, are different as shown in FIG. 2. Since the speeds along the borehole's longitudinal axis of the component waves $S_\parallel$ and $S_\perp$ are different, if the wave S has a velocity component perpendicular to the plane of FIG. 2 (i.e. along the longitudinal axis of the borehole) one will observe a splitting of the energy into two component waves $S_\parallel$ and $S_\perp$ between whose times of arrival the difference increases the further down the borehole axis one measures the response. This phenomenon permits one to detect azimuthal anisotropy and measure its magnitude.

Figure 3:
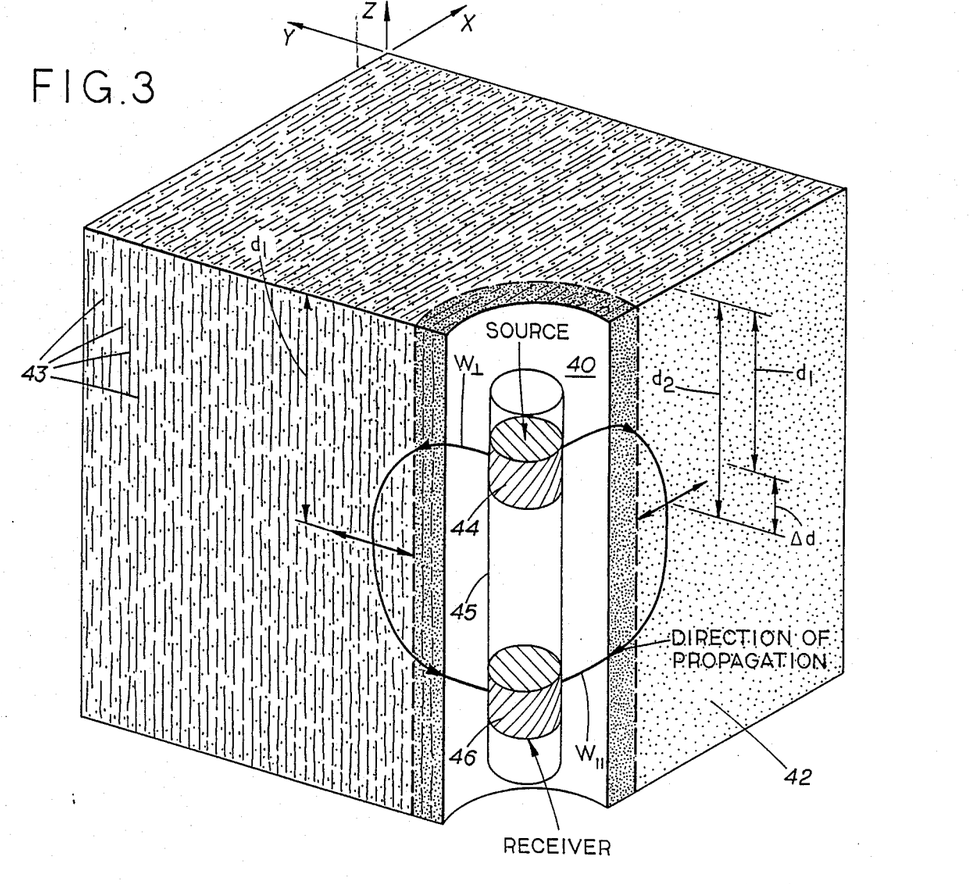
FIG. 3 is a perspective view of a portion of a borehole logging tool disposed in a borehole, showing the paths of two acoustic waves propagating between a pair of transducers in the tool.
Figure 4:
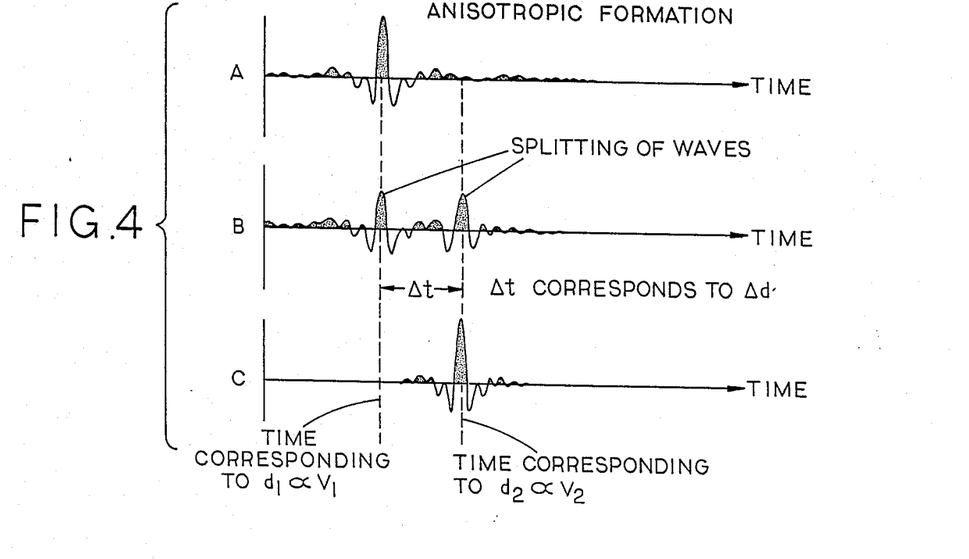
FIG. 4 is a graphical representation of three acoustic wave arrivals typical of those detected in logging an azimuthally anisotropic formation in accord with the inventive method.

FIGS. 3 and 4 illustrate the energy splitting of two components of a multipole acoustic wave produced by source 44 in tool 45 disposed in fluid-filled borehole 40. The z-axis is parallel to the longitudinal axis of the borehole. Formation 42 is permeated by vertical fractures 43. Fractures 43 are parallel to the x-z plane. Component $W_\perp$ of the wave has polarization in the y-z plane (perpendicular to fractures 43); component $W_\parallel$ of the wave has polarization in the x-z plane (parallel to fractures 43). Since formation 42 is azimuthally anisotropic, in a time interval t, component $W_\perp$ will in general propagate to depth $d_1$ while component $W_\parallel$ will propagate to depth $d_2$, where $d_2-d_1=\Delta d$, and $\Delta d>0$. In other words, the times of arrival of $W_\parallel$ and $W_\perp$ at a given depth will be different. If detector 46 is a multipole detector oriented so as to be sensitive only to component $W_\perp$, then the signal received at detector 46 representing the arrival of the wave will appear as in FIG. 4A, with a peak amplitude at time $t_1$. If detector 46 is a multipole detector oriented so as to be sensitive only to component $W_\parallel$, then the signal received at detector 46 representing the arrival of the wave will appear as in FIG. 4C, with a peak at time $t_2$. If detector 46 is a multipole detector oriented (rotated into a desired azimuthal angular position) so as to be sensitive to both components $W_\parallel$ and $W_\perp$, then the signal received at the detector representing the arrival of the wave will appear as in FIG. 4B, with two peaks, separated by time $\Delta t=t_2-t_1$, where $\Delta t$ corresponds to $\Delta d$ in FIG. 3. In contrast, if formation 42 were isotropic (so that all components of an acoustic wave having a given frequency content will have the same speed, $v_f$), then the signal received at detector 46 representing the arrival of the wave would not exhibit splitting as the detector is azimuthally rotated. Rather the detected arrival would have a peak at a time $t_f$ determined by the distance the wave propagates between transmission and detection and the fixed velocity $v_f$ of the isotropic medium.

In the inventive method, a first acoustic wave is generated at a transducer in a borehole so as to propagate through an earth formation surrounding the borehole. An arrival of the first wave is detected at another transducer in the borehole. At least one of the transducers is of the multipole type, and has a first azimuthal orientation. Thus, the wave arrival will have appearance similar to either FIGS. 4A, 4B, or 4C, depending on whether the first azimuthal orientation happens to be parallel (or perpendicular) to any axis of the formation's azimuthal anisotropy (in either of which cases, the arrival will not be split, as in FIGS. 4A and 4C) or happens to be neither parallel nor perpendicular to such an axis of azimuthal anisotropy (in which case, the arrival may be split as in FIG. 4B).

Also, in performing the inventive method, a second acoustic wave arrival is detected at a transducer disposed in the borehole. This second arrival may be associated with the first wave described in the preceding paragraph (i.e., may contain a portion of the energy of such first wave), or may be associated with a second acoustic wave that has been generated by the same or a different transducer than the one that generated the first wave. The second arrival must be associated with a multipole transducer (either with a multipole source or detector, or with both), and the multipole transducer must have a second azimuthal orientation different from the first orientation. Comparison of the first and second arrivals will reveal information about the existence and type of azimuthal anisotropy of the formation. For example, if splitting is observed in one or both of the arrivals, then it follows that the formation is azimuthally anisotropic. If both arrivals exhibit splitting, the relative amplitudes of the double peaks of the arrivals reveal information about the direction of azimuthal anisotropy.

Two preferred embodiments of the inventive method will next be described. The first preferred embodiment employs at least one source of dipole acoustic waves ("dipole source") and at least one detector sensitive to dipole acoustic waves ("dipole detector"). The second preferred embodiment employs at least one detector sensitive to acoustic quadrupole waves ("quadrupole detector"), and either at least one source of monopole acoustic waves ("monopole source") or at least one source of quadrupole acoustic waves ("quadrupole source"), or both a quadrupole source and a monopole source.

Applicants have recognized that the polarization of dipole waves generated by a dipole source is predominantly linear, so that a "dipole-source/dipole-detector" system is adequate for measuring the splitting of dipole acoustic waves in an azimuthally anisotropic formation. In one variation of the inventive method, a single dipole acoustic wave is generated, and arrivals of the wave are detected at two different dipole detectors, where the detectors have different (and preferably, orthogonal) azimuthal orentations. In another variation, two dipole acoustic waves are generated and each is detected at a different dipole detector, or each is detected at the same dipole detector, were the detector is rotated azimuthally between the two wave-detection events.

The inventors have recognized that in an azimuthally anisotropic formation, some of the acoustic wave energy produced by a monopole source in a borehole will couple to a quadrupole mode and hence propagate as a quadrupole wave in the formation. Thus the arrival detected at a detector in the borehole will be a mixture of monopole and quadrupole signals. Accordingly, either a monopole source, or a quadrupole source, with two quadrupole detectors having different azimuthal orientations (or a quadrupole detector that may be rotated azimuthally) may be used to measure anisotropy effects in a preferred embodiment of the inventive method. Similarly, two quadrupole sources with different azimuthal orientations (or one azimuthally rotatable quadrupole source) may be used in an alternative preferred embodiment.

In order to describe a preferred embodiment of the invention, the phrase "simple" azimuthal anisotropy shall be used herein to describe the symmetry of formations that are isotropic in one direction but anisotropic in the azimuthal directions orthogonal thereto and having only two orthogonal azimuthal directions of symmetry. Examples of formations exhibiting simple azimuthal anisotropy include formations that have parallel, vertically oriented cracks, but are otherwise homogeneous. For any source-receiver pair employed in performing this preferred embodiment of the inventive method, the multipole order of one transducer in the pair is a non-negative integer n (such as n=0, corresponding to a monopole transducer; n=1, corresponding to a dipole transducer; n=2, corresponding to a quadrupole transducer; n=3, corresponding to an octopole transducer; and so on), and the multipole order of the other transducer in the pair is n+2m, where n+2m is greater than or equal to zero, and m is an integer (m may be a positive integer, a negative integer, or may be equal to zero). However, one of the transducers in the pair must be a multipole transducer, so that one of the following conditions must be maintained; n>0, m>0, or both n>0 and m>0. For example, the following source-receiver pairs may be employed in performing this embodiment of the inventive method: dipole-source/dipole-receiver, quadrupole-source/quadrupole-receiver, octopole-source/octopole-receiver, monopole-source/quadrupole-receiver, quadrupole-source/-monopole-receiver, monopole-source/16-pole-receiver, 16-pole-source/monopole-receiver, dipole-source/octopole-receiver, or octopole-source/dipole-receiver.

There may be more than one transducer having different multipole orders in a particular system, i.e., one transducer having a multipole order of n+2m, and a second transducer having a multipole order of n+2p. The selection of p would require the same general considerations as the selection of m.

The preferred embodiment described in the previous paragraph is particularly effective for surveying formations exhibiting simple azimuthal anisotropy. In order to study other types of formations (i.e., formations exhibiting complex azimuthal anisotropy), it may be preferable that the limitations in the embodiment of the preceding paragraph be relaxed to permit the integer "m" to be selected from the set of numbers including half-integer numbers as well as integer numbers. For example, to study such complex azimuthally anisotropic formations, it may be desirable to employ a system including a dipole transmitter (n=1) and a quadrupole detector (n+2m=1+2(+½)=2).

Figure 5:
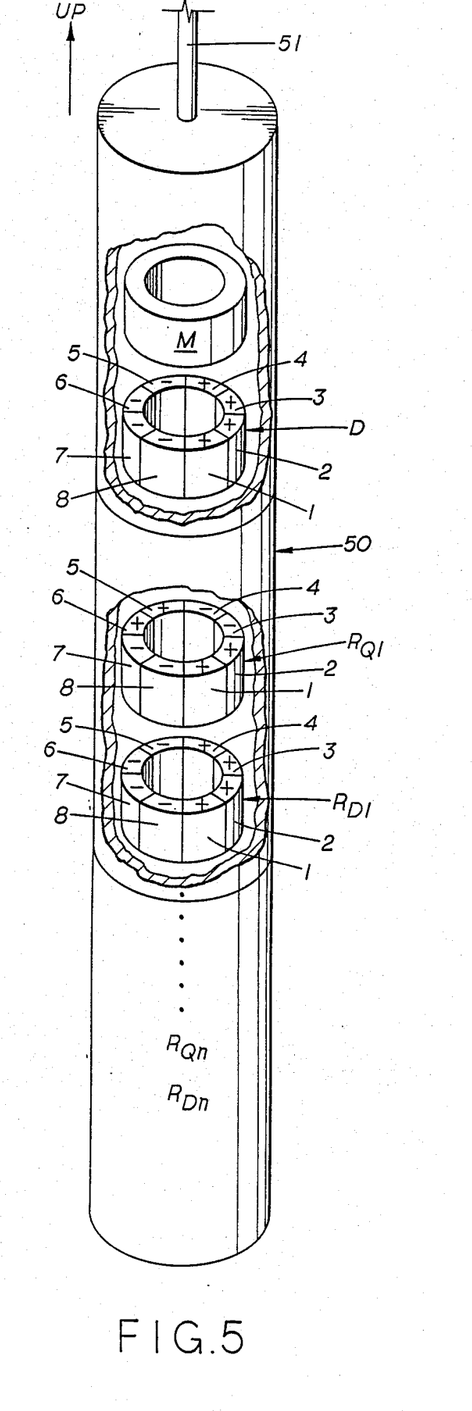
FIG. 5 is a simplified, perspective view of a preferred embodiment of the inventive acoustic well logging system.

A preferred design for the inventive well logging tool will next be described with reference to FIG. 5. The transducers of the FIG. 5 system are mounted in sonde 50 which may be suspended in a borehole from cable 51. Monopole source M, which may be selected from those conventional monopole sources that are commercially available, is used to generate monopole signals as in a conventional sonic tool. Not shown are the electrical connections between the acoustic sources of FIG. 5 and a power source and a firing and control unit, since such connections may be accomplished in a well known manner, and are schematically shown in FIG. 1. Dipole acoustic wave transmitter unit D includes eight equal segments of a piezoelectric cylinder that are electrically driven so that each pair of oppositely facing segments can be driven as a dipole source. The particular design of unit D shown in FIG. 5 thus comprises four distinct dipole sources each azimuthally oriented at 45° with respect to the adjacent dipole source (e.g., pairs 1-5, 2-6, 3-7, and 4-8 are distinct dipole sources).

Receiver unit $R_{Q1}$ includes two acoustic quadrupole wave receivers. Receiver unit $R_{D1}$ includes four acoustic dipole wave receivers. $R_{Q1}$ and $R_{D1}$ together will be collectively referred to as a receiver station. Although a single receiver station is shown in FIG. 5, preferably there will be at least two receiver stations in housing 50, each containing both dipole receivers (as in $R_{D1}$) and quadrupole receivers (as in $R_{Q1}$). Each receiver unit shown in FIG. 5 is electrically divided into eight equal segments (similarly to multi-dipole source D described above). Each of the four dipole receivers of $R_{D1}$ is aligned, respectively, with one of the four dipole sources of transmitter unit D.

The segments of receiver unit $R_{D1}$ are electrically connected to form four dipole receivers separated at 45° azimuthal angles, and the segments of unit $R_{Q1}$ are electrically connected to form two quadrupole receivers (1-3-5-7 and 2-4-6-8). When one dipole source is fired (e.g., source 1-5), any receiver in each receiver station is activated to record an arrival of the generated signal. The same source can be fired four times and consequently record the signal at four differently oriented receivers, or one can fire one dipole source and simultaneously record the signals received at all four dipole receivers. As a result of sequentially firing the four dipole sources and detecting the associated arrivals at one receiver station, one detects sixteen dipole signals associated with four different azimuthal angles with four duplications which may be analyzed to distinguish and measure the degree of formation azimuthal anisotropy. When the monopole source M is fired, one or two quadrupole receivers (receiver 1-3-5-7, or receiver 2-4-6-8, or both of these receivers) will be operated to detect arrivals of the signal produced by source M. By analyzing the two detected quadrupole wave arrivals in the manner described above, one detects the existence and magnitude of formation anisotropy. Other receiver stations positioned at larger separations from the source will provide redundancy which will improve the accuracy of the system.

Figure 6:
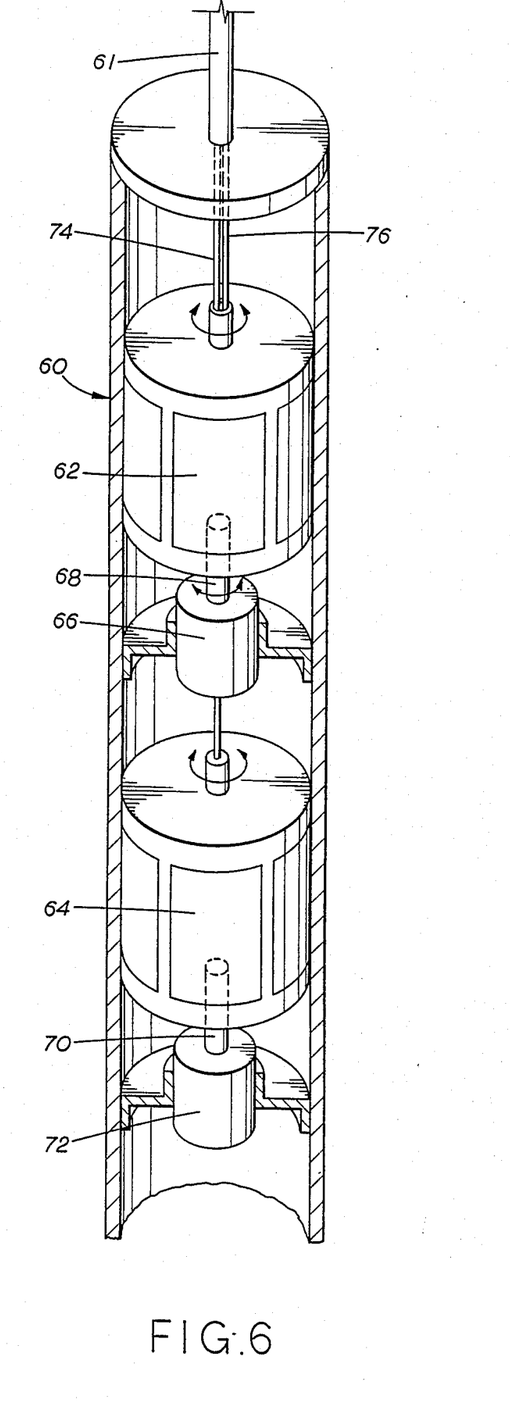
FIG. 6 is a simplified, perspective view of an alternative embodiment of the inventive acoustic well logging system.

An alternative embodiment of the inventive well logging tool is shown in simplified form in FIG. 6. Source 62 and detector 64 are housed in sonde 60, which may be suspended in a borehole at the end of cable 61 so that the sonde's longitudinal axis is substantially parallel to the borehole's longitudinal axis. Transducers 62 and 64 may be selected using the criteria described above so that the FIG. 6 system is capable of performing the inventive method. Preferably, transducers 62 and 64 will be of the dipole type, or source 62 will be a monopole source and detector 64 will be a quadrupole detector. Stepping motors 66 and 72 are mounted in sonde 60 for rotating transducers 62 and 64 relative to each other about the longitudinal axis of sonde 60. Transducers 62 and 64 are mounted, respectively, on hollow shafts 68 and 70 which are aligned with the longitudinal axis of sonde 60. Motors 66 and 72 may be operated independently in response to electrical signals supplied via electrical lines 74, 76. Line 74 extends through shafts 68 and 70 and is connected to motor 72. Line 76 extends through shaft 68 and is connected to motor 66. Motors 66 and 72 may be selected from commercially available models.

In all embodiments of the invention, the frequency content of the acoustic wave generated by the transducer (or transducers) employed will determine the relative portions of energy in the wave that will propagate through the formation in the shear-wave mode and in the compressional-wave mode. The preferred operating frequencies producing shear waves or compressional waves of various multipole orders have been described in U.S. Pat. No. 4,606,014, issued Aug. 12, 1986 to Winbow, et al., U.S. patent application Ser. No. 379,684 (filed May 19, 1982); U.S. patent application Ser. No. 440,140 (filed Nov. 8, 1982); and U.S. Pat. No. 4,649,526, issued Mar. 10, 1987 to Winbow, et al., all assigned to the assignee of the present application.

As an example of the inventive method's resolution, consider the dipole-transmitter/dipole-detector embodiment, where the transmitter is operated at a frequency such that the emitted dipole wave has predominant frequency of about 4 kHz. In a typical formation having a shear-wave slowness of $(150 \ \mu sec/ft)^{-1}$) with an azimuthal anisotropy of 10%, we expect to detect a shear-wave slowness variation of $(15 \ \mu s/ft)^{-1}$ between the two principal polarization axes. For a logging tool with a separation of ten feet between dipole source and dipole detector, the time difference between the two polarized shear arrivals would be approximately 150 $\mu s$, which is about 60% of a complete cycle for a 4 kHz shear-wave signal. The highest resolution one can achieve in this embodiment using a standard pulsing technique wherein the dipole transmitter emits a dipole pulse is approximately 4 μs. For the situation described above, using an inter-receiver separation of 1 foot, 4 μs of time resolution corresponds to detecting an anisotropy of 2.6%. To increase the resolution a larger inter-transducer separation can be used.

Driving the dipole transmitter with a sine-wave power generator instead of the more usual pulsing technique would further enhance the system's resolution because the phase shifts between monochromatic sine waves can be determined more precisely than can the time interval between the arrival of two impulses. The technique of measuring phase shifts between the sine waves detected at separated locations in a well logging system is well known. An example of the phase precision achievable using sinusoidal signals is 2°, which is equivalent to about 1.4 μs for a 4 kHz sine wave. As above, for a shear-wave slowness of $(150 \ \mu s/ft)^{-1}$, 1.4 μs time resolution allows 1% of anisotropy to be detected using a one-foot inter-receiver separation. If the number of dipole transducers (each associated with a pair of vibrating elements) in each receiver unit of the inventive tool (i.e. receiver unit $R_{D1}$ of FIG. 5) is increased to 8 or 16 (i.e. if the number of vibrating elements in each unit is increased to 16 or 32), an increase in the azimuthal resolution is obtained. A 32-element receiver unit would form 16 pairs of dipole receivers with a relative angular orientation of 11.25°.

If greater resolution is needed, an additional dipole receiver unit may be added, each transducer in this additional unit pair being oriented at 5.625° relative to the corresponding transducer in the unit pair described in the preceding paragraph. This latter, more complex tool, would be suitable for investigating more complex forms of anisotropy created, for example, by the presence of more than one set of fractures in the formation.

In embodiments employing sine wave acoustic signals, it may be desirable to employ a swept-frequency sine wave signal, or a pseudo-random sweep signal, analogous to those commonly produced by seismic land-vibrators during seismic surveying operations, but for this purpose operating at logging frequencies (kHz).

In all embodiments of the invention, the absolute orientation of the tool may be determined using a gyrocompass, or any other conventional means suitable for accomplishing this purpose.

Various modifications and alterations in the inventive method and system will be apparent to those skilled in the art without departing from the scope of this invention. Although the invention has been described in connection with specific preferred embodiments, it should be understood that the invention as claimed should not be unduly limited to such specific embodiments.

We claim:

1. A method, using at least one multipole transducer, for logging a borehole having a longitudinal axis to obtain information for measuring azimuthal anisotropy of a formation traversed by the borehole, including the steps of:
   (a) operating a first transducer disposed in the borehole to generate a first acoustic signal that will propagate into the formation from within the borehole;
   (b) detecting an arrival of the first acoustic signal at a second transducer disposed in the borehole, where one of the first and second transducers is a monopole transducer and the other is a quadrupole transducer oriented at a first azimuthal angle relative to the longitudinal axis of the borehole; and
   (c) at a location within the borehole, detecting another acoustic arrival, where the arrival detected in this step (c) is associated with a second azimuthal angle relative to the longitudinal axis of the borehole.

2. The method of claim 1, wherein the first acoustic signal is impulsive.

3. The method of claim 1, wherein the first acoustic signal is sinusoidal.

4. The method of claim 3, wherein the first acoustic signal is a swept-frequency sine wave.

5. The method of claim 3, wherein the first acoustic signal is a pseudo-random sweep signal.

6. The method of claim 1, wherein the first transducer is a monopole transducer, and the second transducer is a quadrupole transducer oriented at said first azimuthal angle relative to the borehole's longitudinal axis, and including the step of:
   (d) operating a third transducer disposed in the borehole, where the third transducer is a quadrupole transducer oriented at said second azimuthal angle to receive the other acoustic arrival.

7. The method of claim 1, wherein the first transducer is a quadrupole transducer oriented at said first azimuthal angle and the arrival detected in step (c) is associated with a second acoustic signal azimuthally distinct from the first acoustic signal, and also including the step of:
   (d) operating a third transducer disposed in the borehole, where the third transducer is a quadrupole transducer oriented at said second azimuthal angle relative to the borehole's longitudinal axis, to generate the second acoustic signal in such a manner that the second acoustic signal will propagate into the formation from within the borehole.

8. The method of claim 6, wherein the second and third transducers are located at substantially the same axial location along the borehole's longitudinal axis.

9. The method of claim 7, wherein the first and third transducers are located at substantially the same axial location along the borehole's longitudinal axis.

10. A method, using at least one multipole transducer, for logging a borehole having a longitudinal axis to obtain information for measuring azimuthal anisotropy of a formation traversed by the borehole, including the steps of:
   (a) operating a first transducer disposed in the borehole to generate a first acoustic signal that will propagate into the formation from within the borehole;
   (b) detecting an arrival of the first acoustic signal at a second transducer disposed in the borehole, where one of the first and second transducers is a monopole transducer having multipole order $n=0$ and the other is a multipole transducer having multipole order $n+2m$, where m is a member of the set of integers and half-integer numbers and $n+2m>0$, at least one of the transducers defining a first azimuthal angle relative to the longitudinal axis of the borehole;
   (c) rotating said multipole transducer to define a second azimuthal angle relative to the longitudinal axis of the borehole;
   (d) operating said first transducer to generate a second acoustic signal azimuthally distinct from said first acoustic signal; and
   (e) detecting the arrival of the second acoustic signal with the second transducer.

11. An apparatus for logging a borehole to obtain information for measuring azimuthal anisotropy of a formation traversed by the borehole, including:
(a) a housing adapted to be suspended in the borehole and having a longitudinal axis;
(b) a first monopole transducer having multipole order $n=0$ mounted in the housing and capable of generating a first acoustic signal that will propagate from within the borehole into the formation;
(c) a first multipole receiver, having multipole order $n+2m$, where n is zero, m is a member of the set of integers and half-integer numbers, and $n+2m>0$, and capable of detecting an arrival of the first acoustic signal, said first multipole receiver being mounted in the housing at a first azimuthal angle relative to the longitudinal axis; and
(d) a second multipole receiver, having multipole order $n+2p$, where n is zero, p is a member of the set of integers and half-integer numbers, and $n+2p>0$, and capable of detecting an arrival of the first signal, said second multipole receiver being mounted in the housing at a second azimuthal angle relative to the longitudinal axis.

12. The apparatus of claim 1, including a receiver unit having longitudinal dimension not greater than the approximate longitudinal dimension of the first transducer, and wherein the first and second receivers comprise azimuthally distinct portions of the receiver unit.

13. An apparatus for logging a borehole to obtain information for measuring azimuthal anisotropy of a formation traversed by the borehole, including:
(a) a housing adapted to be suspended in the borehole and having a longitudinal axis;
(b) a first multipole transmitter having multipole order $n+2m$, where n is zero, m is a member of the set of integers and half-integer numbers, and $n+2m>0$, said first multipole transmitter being mounted in the housing at a first azimuthal angle relative to the longitudinal axis, and being capable of generating a first acoustic signal that will propagate from within the borehole into the formation;
(c) a second multipole transmitter, having multipole order $n+2p$, where n is zero, p is a member of the set of integers and half-integer numbers, and $n+2p>0$, said second multipole transmitter being mounted in the housing at a second azimuthal angle relative to the longitudinal axis, and being capable of generating a second acoustic signal that will propagate from within the borehole into the formation; and
(d) a monopole receiver, having multipole order $n=0$, mounted in the housing at a position spaced along the longitudinal axis from the first transmitter and the second transmitter, and capable of detecting arrivals of the first and second acoustic signals.

14. The apparatus of claim 13, including a transmitter unit having longitudinal dimension not greater than the approximate longitudinal dimension of the receiver, wherein the first and second multipole transmitters comprise azimuthally distinct portions of the transmitter unit.

15. An apparatus for logging a borehole to obtain information for measuring azimuthal anisotropy of a formation traversed by the borehole, including:
(a) a housing adapted to be suspended in the borehole and having a longitudinal axis;
(b) a first monopole transducer, having multipole order $n=0$, mounted in the housing and capable of generating an acoustic signal that will propagate from within the borehole into the formation;
(c) a second transducer having multipole order $n+2m$, where n is zero, m is a member of the set of integers and half-integer numbers, and $n+2m>0$, said second transducer being mounted in the housing and capable of detecting an arrival of the acoustic signal; and
(d) means for rotating the second transducer azimuthally.

16. A method, using at least one multipole transducer, for logging a borehole having a longitudinal axis to obtain information for measuring azimuthal anisotropy of a formation traversed by the borehole, including the steps of:
(a) operating a first transducer disposed in the borehole to generate a first acoustic signal that will propagate into the formation from within the borehole;
(b) detecting an arrival of the first acoustic signal at a second transducer disposed in the borehole, where one of the first and second transducers is a dipole transducer and the other is a quadrupole transducer, at least one of the transducers defining a first azimuthal angle relative to the longitudinal axis of the borehole; and
(c) at a location within the borehole, detecting another acoustic arrival associated with a second azimuthal angle relative to the longitudinal axis of the borehole.

17. The method of claim 16, wherein the first transducer is a dipole transducer, the second transducer is a quadrupole transducer and including the step of:
(d) operating a third transducer disposed in the borehole, where the third transducer is a quadrupole transducer oriented at said second azimuthal angle to receive the other acoustic arrival.

18. The method of claim 16, wherein the first transducer is a dipole transducer, the second transducer is a quadrupole transducer, the arrival detected in step (c) is associated with a second acoustic signal azimuthally distinct from the first acoustic signal, and including the step of:
(d) operating a third transducer disposed in the borehole, where the third transducer is a dipole transducer oriented at said second azimuthal angle to transmit the second acoustic signal.

19. The method of claim 16, wherein the first transducer is a quadrupole transducer, the second transducer is a dipole transducer, and including the step of:
(d) operating a third transducer disposed in the borehole, where the third transducer is a dipole transducer oriented at said second azimuthal angle relative to the borehole's longitudinal axis, to receive the other acoustic arrival.

20. The method of claim 16, wherein the first transducer is a quadrupole transducer, the second transducer is a dipole transducer, the arrival detected in step (c) is associated with a second acoustic signal azimuthally distinct from the first acoustic signal, and including the step of:
(d) operating a third transducer disposed in the borehole, where the third transducer is quadrupole transducer oriented at said second azimuthal angle relative to the borehole's longitudinal axis, to generate the second acoustic signal.

21. A method, using at least one multipole transducer, for logging a borehole having a longitudinal axis to obtain information for measuring azimuthal anisotropy of a formation traversed by the borehole, including the steps of:
(a) operating a first transducer disposed in the borehole to generate a first acoustic signal that will propagate into the formation from within the borehole;
(b) detecting an arrival of the first acoustic signal at a second transducer disposed in the borehole, where one of the first and second transducers is a monopole transducer and the other is a dipole transducer, at least one of the transducers defining a first azimuthal angle relative to the longitudinal axis of the borehole; and
(c) at a location within the borehole, detecting another acoustic arrival, where the arrival detected in this step (c) is associated with a second azimuthal angle relative to the longitudinal axis of the borehole.

22. The method of claim 21, wherein the first transducer is a monopole transducer, and the second transducer is a dipole transducer oriented at said first azimuthal angle relative to the borehole's longitudinal axis, and including the step of:
(d) operating a third transducer disposed in the borehole, where the third transducer is a dipole transducer oriented at said second azimuthal angle to receive the other acoustic arrival.

23. The method of claim 21, wherein the first transducer is a dipole transducer oriented at said first azimuthal angle and the arrival detected in step (c) is associated with a second acoustic signal azimuthally distinct from the first acoustic signal, and also including the step of:
(d) operating a third transducer disposed in the borehole, where the third transducer is a dipole transducer oriented at said second azimuthal angle relative to the borehole's longitudinal axis, to generate the second acoustic signal in such a manner that the second acoustic signal will propagate into the formation from within the borehole.

24. The method of claim 22, wherein the second and third transducers are located at substantially the same axial location along the borehole's longitudinal axis.

25. The method of claim 23, wherein the first and third transducers are located at substantially the same axial location along the borehole's longitudinal axis.

26. A method, using at least one multipole transducer, for logging a borehole having a longitudinal axis to obtain information for measuring azimuthal anisotropy of a formation traversed by the borehole, including the steps of:
(a) operating a first transducer disposed in the borehole to generate a first acoustic signal that will propagate into the formation from within the borehole;
(b) detecting an arrival of the first acoustic signal at a second transducer disposed in the borehole, where one of the first and second transducers is a monopole transducer and the other is a octopole transducer, at least one of the transducers defining a first azimuthal angle relative to the longitudinal axis of the borehole; and
(c) at a location within the borehole, detecting another acoustic arrival, where the arrival detected in this step (c) is associated with a second azimuthal angle relative to the longitudinal axis of the borehole.

27. The method of claim 26, wherein the first transducer is a monopole transducer, and the second transducer is an octopole transducer oriented at said first azimuthal angle relative to the borehole's longitudinal axis, and including the step of:
(d) operating a third transducer disposed in the borehole, where the third transducer is an octopole transducer oriented at said second azimuthal angle to receive the other acoustic arrival.

28. The method of claim 26, wherein the first transducer is an octopole transducer oriented at said first azimuthal angle and the arrival detected in step (c) is associated with a second acoustic signal azimuthally distinct from the first acoustic signal, and also including the step of:
(d) operating a third transducer disposed in the borehole, where the third transducer is an octopole transducer oriented at said second azimuthal angle relative to the borehole's longitudinal axis, to generate the second acoustic signal in such a manner that the second acoustic signal will propagate into the formation from within the borehole.

29. The method of claim 27, wherein the second and third transducers are located at substantially the same axial location along the borehole's longitudinal axis.

30. The method of claim 28, wherein the first and third transducers are located at substantially the same axial location along the borehole's longitudinal axis.

31. The apparatus of claim 11, wherein the first and second multipole receivers are dipole transducers.

32. The apparatus of claim 11, wherein the first and second multipole receivers are quadrupole transducers.

33. The apparatus of claim 11, wherein the first and second multipole receivers are octopole transducers.

34. The apparatus of claim 13, wherein the first and second transmitters are dipole transducers.

35. The apparatus of claim 13, wherein the first and second transmitters are quadrupole transducers.

36. The apparatus of claim 13, wherein the first and second transmitters are octopole transducers.

37. The apparatus of claim 11, wherein at least one of the multipole receivers comprises a piezoelectric cylinder electrically divided into a plurality of segments electrically connected to form a multipole receiver.

38. The apparatus of claim 13, wherein at least one of the multipole transmitters comprises a piezoelectric cylinder electrically divided into a plurality of segments electrically connected to form a multipole transmitter.

39. An apparatus for logging a borehole to obtain information for measuring azimuthal anisotropy of a formation traversed by the borehole, including:
(a) a housing adapted to be suspended in the borehole and having a longitudinal axis;
(b) a first dipole transducer having mounted in the housing and capable of generating a first acoustic signal that will propagate from within the borehole into the formation;
(c) a first multipole receiver, having multipole order $n+2m$, where n is a one, m is a member of the set of integers and half-integer numbers, and $n+2m>0$, and capable of detecting an arrival of the first acoustic signal, said first multipole receiver being mounted in the housing at a first azimuthal angle relative to the longitudinal axis; and
(d) a second multipole receiver, having multipole order $n+2p$, where n is one, p is a member of the set of integers and half-integer numbers, and n+2p>0, and capable of detecting an arrival of the first signal, said second multipole receiver being mounted in the housing at a second azimuthal angle relative to the longitudinal axis.

40. An apparatus for logging a borehole to obtain information for measuring azimuthal anisotropy of a formation traversed by the borehole, including:
   (a) a housing adapted to be suspended in the borehole and having a longitudinal axis;
   (b) a first multipole transmitter having multipole order n+2m, where n is one, m is a member of the set of integers and half-integer numbers, and n+2m>0, said first multipole transmitter being mounted in the housing at a first azimuthal angle relative to the longitudinal axis, and being capable of generating a first acoustic signal that will propagate from within the borehole into the formation;
   (c) a second multipole transmitter, having multipole order n+2p, where n is one, p is a member of the set of integers and half-integer numbers, and n+2p>0, said second multipole transmitter being mounted in the housing at a second azimuthal angle relative to the longitudinal axis, and being capable of generating a second acoustic signal that will propagate from within the borehole into the formation; and
   (d) a dipole receiver mounted in the housing at a position spaced along the longitudinal axis from the first transmitter and the second transmitter, and capable of detecting arrivals of the first and second acoustic signals.

41. An apparatus for logging a borehole to obtain information for measuring azimuthal anisotropy of a formation traversed by the borehole, including:
   (a) a housing adapted to be suspended in the borehole and having a longitudinal axis;
   (b) a first transducer having multipole order n+2m, where n is zero, m is a member of the set of integers and half-integer numbers, and n+2m>0, said second transducer being mounted in the housing and capable of detecting an arrival of the acoustic signal;
   (c) a second monopole transducer having multipole order n=0 mounted in the housing and capable of generating an acoustic signal that will propagate from within the borehole into the formation; and
   (d) means for rotating the first transducer azimuthally.

42. An apparatus for logging a borehole to obtain information for measuring azimuthal anisotropy of a formation traversed by the borehole, including:
   (a) a housing adapted to be suspended in the borehole and having a longitudinal axis;
   (b) a first transducer having multipole order n+2m, where n is one, m is a member of the set of integers and half-integer numbers, and n+2m>0, said second transducer being mounted in the housing and capable of detecting an arrival of the acoustic signal;
   (c) a second dipole transducer having multipole order n=1 mounted in the housing and capable of generating an acoustic signal that will propagate from within the borehole into the formation; and
   (d) means for rotating the first and second transducers azimuthally with respect to each other.

43. A method, using at least one multipole transducer, for logging a borehole having a longitudinal axis to obtain information for measuring azimuthal anisotropy of a formation traversed by the borehole, including the steps of:
   (a) operating a first transducer disposed in the borehole to generate a first acoustic signal that will propagate into the formation from within the borehole;
   (b) detecting an arrival of the first acoustic signal at a second transducer disposed in the borehole, where one of the first and second transducers is a dipole transducer having multipole order n=1 and the other is a multipole transducer having multipole order n+2m, where m is a member of the set of integers and half-integer numbers and n+2m>0, at least one of the transducers defining a first azimuthal angle relative to the longitudinal axis of the borehole;
   (c) rotating at least one of said first and second transducers to define a second azimuthal angle relative to the longitudinal axis of the borehole;
   (d) operating said first transducer to generate a second acoustic signal azimuthally distinct from said first acoustic signal; and
   (e) detecting the arrival of the second acoustic signal with the second transducer.

44. The method of claim 16, wherein step (c) comprises:
   operating a third transducer in the borehole to generate a second acoustic signal that will propagate into the formation from within the borehole; and
   detecting an arrival of the second acoustic signal at a fourth transducer disposed in the borehole at the second azimuthal angle, wherein at least one of the third and fourth transducers is a multipole transducer.

* * * * *